US010791136B2

(12) United States Patent
Zoldi et al.

(10) Patent No.: US 10,791,136 B2
(45) Date of Patent: Sep. 29, 2020

(54) SYSTEM AND METHOD FOR EMPIRICAL ORGANIZATIONAL CYBERSECURITY RISK ASSESSMENT USING EXTERNALLY-VISIBLE DATA

(71) Applicant: FAIR ISAAC CORPORATION, Roseville, MN (US)

(72) Inventors: Scott Michael Zoldi, San Diego, CA (US); James Coggeshall, San Diego, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 82 days.

(21) Appl. No.: 15/463,420

(22) Filed: Mar. 20, 2017

(65) Prior Publication Data
US 2018/0270266 A1   Sep. 20, 2018

(51) Int. Cl.
*H04L 29/06* (2006.01)
*G06Q 10/06* (2012.01)

(52) U.S. Cl.
CPC ..... *H04L 63/1433* (2013.01); *G06Q 10/0635* (2013.01)

(58) Field of Classification Search
CPC . H04L 63/14; H04L 63/1408; H04L 63/1425; H04L 63/1433; H04L 63/20; G06F 21/50; G06F 21/57; G06F 21/577; G06Q 10/06; G06Q 10/063; G06Q 10/0635
See application file for complete search history.

(56) References Cited

U.S. PATENT DOCUMENTS

| | | | |
|---|---|---|---|
| 8,027,439 B2 | 9/2011 | Zoldi et al. | |
| 2010/0281539 A1* | 11/2010 | Burns | H04L 63/1441 726/23 |
| 2011/0225650 A1* | 9/2011 | Margolies | G06F 21/554 726/22 |
| 2015/0088597 A1 | 3/2015 | Doherty et al. | |
| 2015/0215332 A1* | 7/2015 | Curcic | H04L 63/1433 726/25 |
| 2016/0050225 A1 | 2/2016 | Carpenter et al. | |
| 2016/0306965 A1* | 10/2016 | Iyer | G06F 21/552 |
| 2018/0026996 A1* | 1/2018 | Park | G06F 21/41 726/23 |

(Continued)

OTHER PUBLICATIONS

Durumeric, Zakir, et. al. "ZMap: Fast Internet-wide Scanning and Its Security Applications." *22nd USENIX Security Symposium*, Aug. 14-15, 2013, Washington, D.C. USENIX Association. (2013):605-619.

(Continued)

*Primary Examiner* — Jung W Kim
*Assistant Examiner* — Adrian Stoica
(74) *Attorney, Agent, or Firm* — Mintz Levin Cohn Ferris Glovsky and Popeo, P.C.

(57) ABSTRACT

A system and method for assessing the cybersecurity breach risk associated with a given organization is disclosed. The system and method assume no internal visibility into any organizational network. A taxonomy of possible data sources is defined and motivated. The system and method are both purely empirical and robust against common difficulties in scoring organizational networks, such as the raw number of network assets owned by the organization.

21 Claims, 3 Drawing Sheets

(56) References Cited

U.S. PATENT DOCUMENTS

| | | | |
|---|---|---|---|
| 2018/0034840 A1* | 2/2018 | Marquardt | G06F 17/30958 |
| 2018/0048668 A1* | 2/2018 | Gupta | H04L 63/1425 |
| 2018/0091540 A1* | 3/2018 | Solow | H04L 63/1433 |
| 2018/0124091 A1* | 5/2018 | Sweeney | G06F 17/30321 |

OTHER PUBLICATIONS

Liu, Yang. et. al. "Cloudy with a Chance of Breach: Forecasting Cyber Security Incidents." *24th USENIX Security Symposium*, Aug. 12-14, 2015, Washington, D.C. USENIX Association. (2015):1009-1024.

Zhang, Jing, et. al. "On the Mismanagement and Maliciousness of Networks." *NDSS '14 Symposium*, Feb. 23-26, 2014, San Diego, CA, USA. (2014):1-12.

Zhang, Jing, et. al. "On the Mismanagement and Maliciousness of Networks." NDSS '14 Symposium, Feb. 23-26, 2014, San Diego, CA, USA. (2014). 25 pages. Slide Presentation.

\* cited by examiner

SYSTEM AND METHOD FOR EMPIRICAL ORGANIZATIONAL CYBERSECURITY RISK ASSESSMENT USING EXTERNALLY-VISIBLE DATA

TECHNICAL FIELD

The subject matter described herein relates to predictive analytics in the setting of multi-class classification. More specifically, this disclosure relates to a system and method for assessing cybersecurity breach risk for an organization that is associated with a set of public network assets.

BACKGROUND

Cybersecurity breaches comprised of theft of sensitive information have become increasingly common, difficult to detect, and costly. Virtually all organizations have some online presence, while many of these organizations do not rigidly follow best security practices such as endpoint configuration and monitoring, SSL certificate maintenance, and isolation of sensitive information. Even ostensibly innocuous organizations are seen as increasingly worthwhile targets among cyber criminals, both because of the increasing ease with which they can be breached, as well as the increasing likelihood that a breach will yield saleable information on the black market and a long time to detection.

For these reasons, a market for cybersecurity incident insurance among organizations has grown substantially. As both the cybersecurity market and the actual costs incurred from cyber breaches suffered have grown, there is a demand for an empirically derived measure of incident risk, and a need for a new cybersecurity risk score associated with the likelihood that the organization will suffer a breach, the expected value of its confidential information, and the expected potential damage the organization might suffer due to exposure of its confidential information.

In the past, the measurement of an organization's overall likelihood to suffer a cybersecurity breach has been driven by expert questionnaires, penetration testers, audits, and heuristic measurements. Although the resulting risk assessments may provide substantial predictive power, they are inherently subjective. The canonical approach in producing such an empirical measure of risk has been to rely on fine-grained measurements of network traffic internal to the organization, which allows for arbitrarily fine detail; however, in practice, both security concerns and configuration challenges have hindered efforts to produce a robust, generic measure of cyber risk based on data of this nature.

Accordingly, what is needed is a technique for measuring an organization's overall likelihood to suffer a cybersecurity breach using fully empirical methods, which can model an expected value of the organization's confidential information, and an expected potential damage the organization might suffer due to exposure of its confidential information by the cybersecurity breach.

SUMMARY

This document presents a computer-implemented predictive analytics system and method in the setting of cybersecurity risk assessment of a specified organization.

In some aspects, systems and methods are described by which a cyber breach risk of an organization is assessed by empirical, external means. In some implementations, assessing a risk of large networks that are mostly well-run is addressed, by being able to characterize the risk of the organization at large in terms solely or more strongly of the weakest network prefix within that organization. Accordingly, the described system and method disclose a novel technique by which to score individual network prefixes, and a method by which to combine the score associated with the riskiest prefix(s) to generate an overall organization score.

Figure 2:
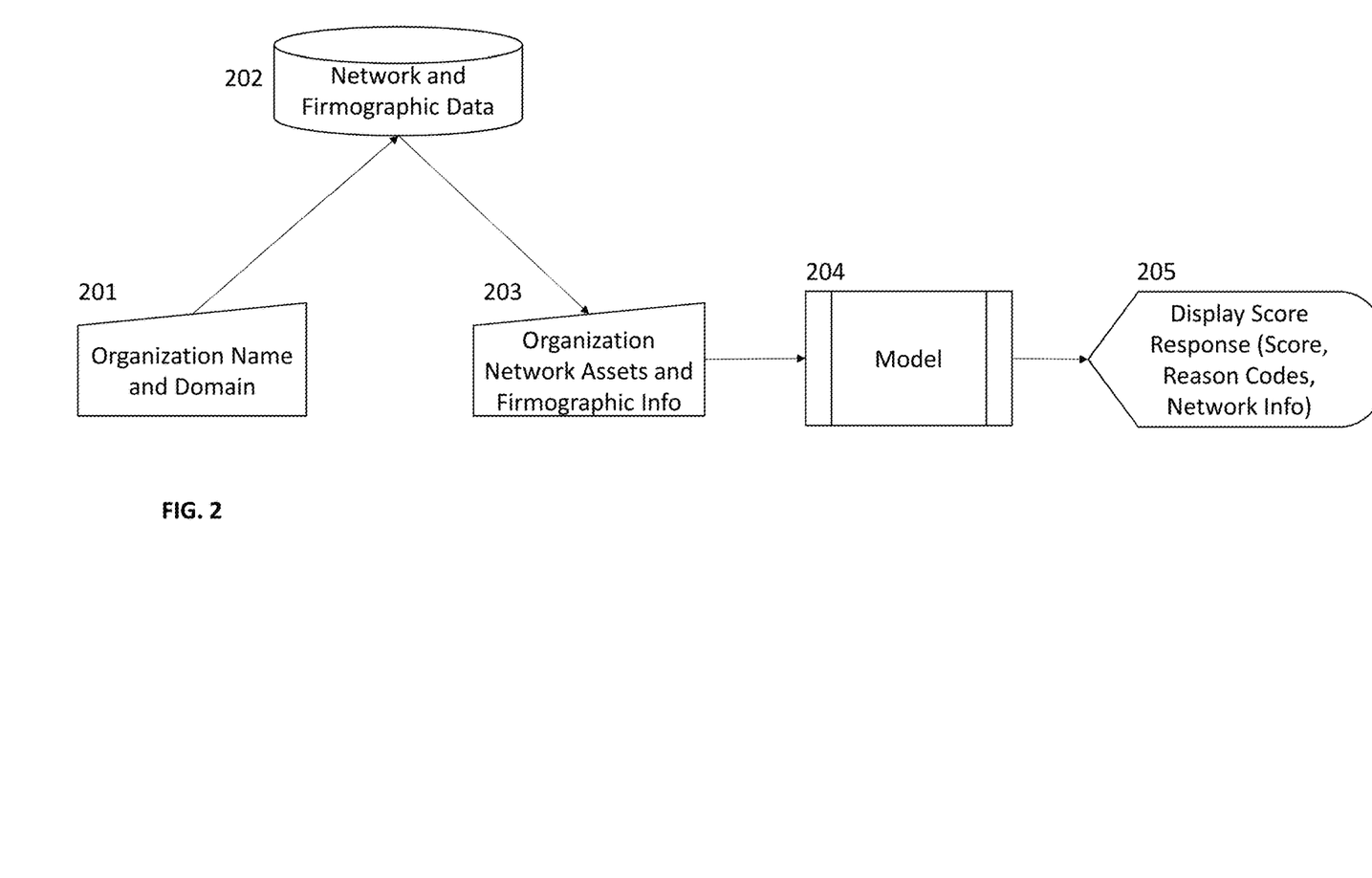
FIG. 2 illustrates a method incorporating the process flow of FIG. 1, and by which users interact with the system.

In preferred implementations, the specified organization is, by other means, associated with a set of IPv4 and/or IPv6 network blocks owned by the organization in question. FIG. 2 demonstrates this process assuming manual intervention in the association process. A collected dataset, consisting of potentially multiple historical observations of various characteristics associated with each individual address within one of the previously associated network blocks, is presented to an aggregation processor which executes an algorithm calculate multiple features indicative of cybersecurity breach risk. A subset of these features is calculated by aggregating all records within the dataset, producing "organization features", while additional subsets are calculated by aggregating only those records within the dataset associated with a specific network, producing "network features". Such an additional subset of features is included among the broader set of features for every network comprising the organization, yielding a set of network features for each. The multiple organization features are then used as inputs to an analytic organization model which calculates a security probability score, while the multiple sets of network features are used as inputs to a network model, by which each individual network is assigned its own security probability score. The probability score corresponding to the organization model is then combined in a predetermined manner with the set of probability scores corresponding to the network model to produce a final "Score Response" consisting both of a numeric cybersecurity breach risk score leveraging both organizational and network features and a ranked list of factors contributing to that score based on these inputs for use in remediation using the score.

In such embodiments, the Score Response represents the cybersecurity breach risk and contributing factors for the organization in question. In addition to reflecting information derived from the individual network scores and features—explicitly via the reason codes, and implicitly via the score itself—the Score Response may be augmented by some or all of the individual network scores or reason codes themselves. Whether and how such augmentation occurs, including the process by which the networks whose scores and reason codes are added to the Score Response are selected and the specific information relevant to these networks are determined, and may vary based on the implementation in question.

In one aspect, a computer-implemented method includes the step of scoring, by at least one data processor, individual network prefixes of a computer network of computer endpoints associated with an organization. The scoring is processed according to a cybersecurity breach risk scoring model executed by the at least one data processor on a dataset associated with the individual network prefixes, the scoring generating a score representing a risk of a cybersecurity breach of each of the individual network prefixes. The method further includes the step of aggregating, by the at least one data processor, the one or more network prefixes of the computer network of computer endpoints associated with the organization into an aggregated computer network dataset. The method further includes the step of scoring, by the at least one data processor, the aggregated computer network dataset. The scoring is processed according to a cybersecurity breach risk scoring model executed by the at least one data processor on the aggregated computer network dataset and one or more riskiest of the individual network prefixes to generate an overall organization score, the riskiest of the individual network prefixes being determined based on a threshold score determined by the at least one data processor according to the cybersecurity breach risk scoring model.

In another aspect, a method, computer program product, and system execute a process including steps of calculating, by at least one data processor, a risk of a cybersecurity breach for each of a plurality of network blocks associated with an organization, each of a plurality of network blocks having an individual network address of a network associated with the organization, the calculating being based on a plurality of historical observations of one or more features associated with each of the plurality of network blocks. The process further includes aggregating, by the at least one data processor, all records in the dataset associated with organization features to calculate a first subset of the one or more features associated with the plurality of network blocks, and aggregating, by the at least one data processor, all records in the dataset associated with network features to calculate a second subset of the one or more features associated with each of the plurality of network blocks. The process further includes calculating, by the at least one data processor according to an analytic organization model, an organizational cybersecurity breach probability score with the aggregated records associated with the organizational features, and calculating, by the at least one data processor according to a network model, a network cybersecurity breach probability score with the aggregated records associated with the network features. The process further includes combining, by the at least one data processor, the organizational cybersecurity breach probability score and the network cybersecurity breach probability score to generate a score response comprising a numeric cybersecurity breach risk score that leverages both the organizational features and the network features and a ranked list of factors contributing to their respective scores.

Implementations of the current subject matter can include, but are not limited to, systems and methods consistent with the disclosure herein, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Recent technological advances rendering internet-wide network scanning feasible, on a short timescale, with minimal infrastructure overhead, have stimulated entirely new lines of inquiry regarding the potential applications of detailed analysis of public-facing network assets in general. An immediate application of such analyses is in measuring the degree of vulnerability associated with a set of public-facing network assets, to establish that it is related to the overall security posture of the organization owning those assets, and to measure precisely the severity of cyber risk to which the organization is exposed based on its security posture. In particular, not only are externally observable characteristics of an organization's network informative in forming such an empirical assessment, but they also may be used to predict a probability that the organization in question will suffer a cybersecurity breach incident in the future, as described in more detail below.

In accordance with systems and methods described herein, a rich variety of externally observable data may be collected with relative ease owing the aforementioned recent technological advances, and that among these data are signals indicating a wide range of aspects of the security posture associated with the organization owning the network assets in question. Signals derived from internet-wide scans can be characterized as illustrative of an organization's disposition in its capacity to regulate its own security posture. Similarly, organizations owning network assets that appear to engage in malicious or illicit activity such as spam or phishing are characterized as indicative of the organization's disposition with respect to its vigilance and ability to modulate the activities occurring on devices on its network. These valid characterizations can be powerful predictors of cyber breach risk.

Given the richness and volatility of the ecosystem around vulnerability exploits, it is unlikely that any specific probe of an organization's public-facing network assets could be expected to convey no information whatsoever regarding the security posture of the organizations owning those assets. However, some probes are more informative from the breach risk perspective than others.

For example, domain name server (DNS) resolvers that respond to public queries are themselves indicative of risk insofar as they increase attack surface, but the subset of those resolvers that are configured to allow recursive DNS resolution requests are much more strongly indicative of risk. Recursive DNS resolution is well known by the security community to enable amplification of distributed denial of service (DDoS) campaigns, and is considered a poor security practice. While the organization owning an open recursive resolver might not necessarily become the target of such an attack, it is very rare that an organization have a legitimate need to run an open recursive resolver; far more frequently it is the result of a misconfiguration indicating a poor organizational security posture.

By the same token, the sheer number of network assets owned by an organization that engage in secure sockets layer/transport layer security (SSL/TLS) handshakes is indicative of risk; the fraction of these network assets that are misconfigured in an observable manner is far more so. In particular, servers presenting clients with an invalid certificate chain as part of the handshake process are badly misconfigured because they negate the primary benefit of TLS from the authentication perspective. Hypertext Transport Protocol with a connection encrypted by Transport Layer Security (HTTPS) is perhaps the most ubiquitous use of TLS; thus misconfiguration in this context is especially egregious. Proper configuration in this context entails that the certificate chain presented to the client by the server consist entirely of certificates signed by a trusted authority and that the root certificate is signed by a trusted root certificate authority. Certificate chains may be invalid because of certificate expiration, untrusted issuing authority, and being self-signed, to name a few.

Several additional targeted probes can be used in informing the assessment of the security posture of an organization. For example, the number of servers responding to NTP requests in general and the subset of these that respond to specific requests in such a way as to suggest that they are susceptible to well-known exploits can be indicative of mismanagement. Similarly the number of network assets configured to respond to ICMP echo requests—despite its being unrelated in the immediate sense to any particular security concern specific to the asset itself—is a wholly unnecessary configuration setting, which can allow an attacker to map out the organization's network in order to identify weaknesses, and which is trivially modified. Thus this signal reflects the degree to which best practices are adhered to by the network security administration within the organization, and reflects the relative ease with which a determined attacker might discover weak points in the organization's network.

In addition to the targeted probes described above, a separate class of signals based on several reputation blacklists, darknet monitors, and other sources of lists identifying network assets have been identified and observed as engaging in suspicious activity, such as scanning, phishing schemes, and spam email. This class of signals comprises externally visible information that may be associated with network assets on a global basis and are suggestive of breach risk and also available to would-be cyber attackers.

While the measurements described above may provide an accurate measure of organizational security risk, they all rely on the organization in question having been associated with a set of owned network assets. However, many organizations do not own any network assets but nevertheless have a tangible internet presence; for example, such an organization may run its public-facing infrastructure on a third-party public cloud platform such as Amazon Web Services (AWS), in which all public internet protocol addresses (IPs) are owned by Amazon despite the corresponding assets being managed by the organization. Such organizations are not suitable for scoring with a model relying wholly on asset-based data sources. In these cases, an informative score may yet be computed by examining the organization's demographic information such as total number of employees, total annual sales, industry classification codes (e.g. SIC), geographic location of the headquarters, number of physical corporate locations, etc.

Among the many fundamental difficulties involved in producing such a risk assessment are the questions of how the size of the organization's attack surface is measured, and what this measurement suggests about its likelihood of suffering a breach. In the most tangible aspect of attack surface, intuition suggests simply that risk scales linearly in the size of the network—as reflected by the number of routable IP addresses, blocks, or endpoints within these blocks—because each additional endpoint (or pool of endpoints within a block) represents a new independent vector for penetration. Such an approach is clearly naïve: for example, a large organization with excellent security practices may maintain large numbers of secure endpoints on static routable IP addresses, all managed uniformly by a single central administrator. In this case, it is unlikely that an increase in the number of endpoints would imply an increase in breach risk. On the other hand, the same organization's breach risk would increase dramatically if even a very small number of poorly-managed endpoints were added to its collection of network assets.

The system and method described in this document consists of an algorithm by which an organization's cybersecurity breach risk score may be calculated. Specifically, this disclosure relates to a multi-faceted process comprising calculation both of an "overall" score and a set of "network" scores calculated using each individual component network—necessarily comprising a mutually-disjoint set of address blocks that covers the organization's address space—associated with that organization separately. The organization in question is presumed to have been associated with at least one contiguous network block consisting of at least one network address.

The process by which the organization in question is associated with the at least one network block may necessitate extensive use of regional internet registries or other internet governing bodies, as well as data provided by commercial vendors for this purpose specifically. This association helps identify all network addresses owned or otherwise controlled by the organization in question. Furthermore, any of the score and/or feature calculations described herein may make use of additional salient information, such as information from internet governing organizations and commercial vendors, identified, associated, prepared, and processed via any of a number of known mechanisms. Furthermore, such information need not necessarily be associated with a set of network addresses or blocks but potentially with the organization itself—for example, SIC code or organization mailing address may be used in calculating features as described in this disclosure; in this case the features and risk scoring method and implementation are in the scope of this disclosure.

Figure 1:
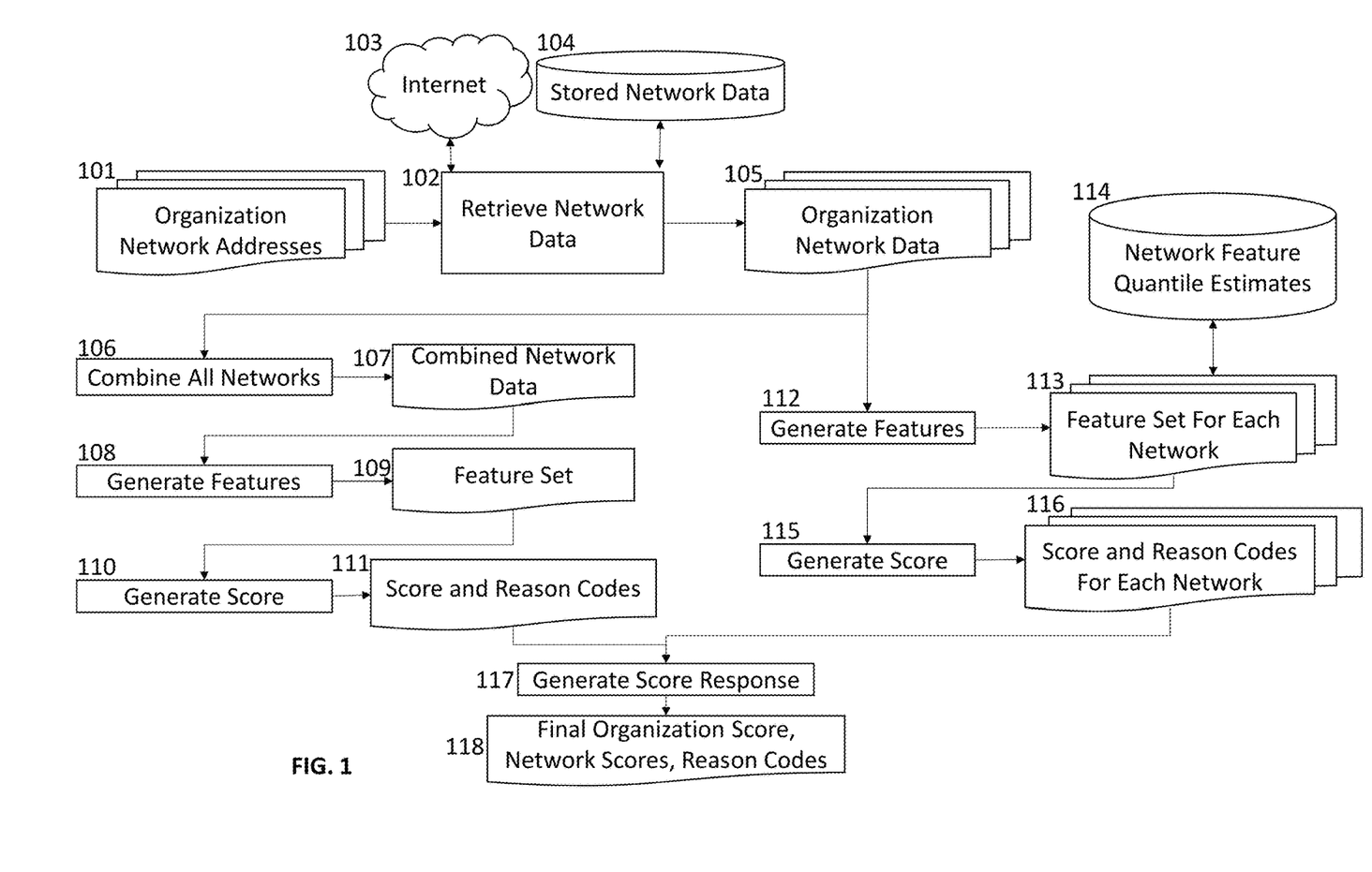
FIG. 1 is a process flow diagram illustrating a method executed by a system for empirical organizational cybersecurity risk assessment using externally-visible data.

FIG. 1 is a process flow diagram illustrating a method executed by a system for empirical organizational cybersecurity risk assessment using externally-visible data, and by which an organization is assigned a score according to an analytic model. The organization's network addresses (101) are supplied in advance and are used to collect a dataset (105) of externally-visible raw data corresponding to each of these addresses or to the organization as a whole. The network data (105) is then aggregated (106) into a single set (107) containing all raw data records, the entirety of which is used (108) to generate a set of risk scoring features (109), which are in turn used as input variables to an analytic model (110) to obtain a risk score and associated reason codes (111). Simultaneously, the feature generation process (112) is performed on the organization's network data (105) for each individual network separately, resulting in a set of generated risk scoring features (113) for each individual network within the organization. The features within the feature set (113) are used to update a set of feature quantile estimates (114) maintained by the scoring system and are in turn rescaled by the current quantile estimates, resulting in a set of features suitable for scoring by an analytic model (115), resulting in a score and set of reason codes for each network (116). Finally, the score and reason codes (111) for the organization's network as a whole are combined (117) with the set of scores and reason codes (116) for each individual network to produce a final overall organization score, set of network scores, and reason codes (118). In some implementations, a method uses all addresses within the organization's associated network blocks to retrieve records from a database (104) containing observations regarding these and other addresses, or to create and insert new such records dynamically by accessing the internet (103). For example, such a database may contain results of a port scan in which all addresses owned by the organization (and possibly additional addresses) are scanned daily in order to determine which, if any, of these addresses appear to be routed to a host on which any or all of a particular set of transmission control protocol (TCP) and/or user datagram protocol (UDP) ports are open, or appropriate requests are being responded to. Similarly, a record that is created dynamically may be the result of a new port scan performed contemporaneously. Such dynamically-created records may furthermore be inserted into the database in question in real time, obviating the distinction between these two mechanisms of record retrieval in the context of this disclosure.

Each record retrieved from the database contains results of a set of measurements recorded for a single address at any given time. Multiple records for a single given address, corresponding to different measurement dates, may therefore be among the records retrieved via this process. Once the set of records have been retrieved, an aggregation process can be performed to generate a set of features suitable for use as inputs to an analytic risk scoring model based on the entire set of retrieved records, and as described in more detail below. In preferred implementations, the specified organization is associated with a set of IPv4 and/or IPv6 network blocks owned by the organization in question.

FIG. 2 illustrates a method incorporating the process flow of FIG. 1, and by which users interact with the system, assuming manual intervention in the association process. The organization name and domain (201) are used to retrieve network blocks and additional organization-level data (202)—such as SIC code, organization name, and RIR entries—which are returned to the user for a decision (203) as to whether to associate these data with the organization to be scored. The resulting selected data are used be the model (204) to produce a score response as in FIG. 1, the result of which is displayed (205) to the user. In particular, in the embodiment shown in this figure, the user provides certain information—such as the organization name—regarding the organization(s) to be scored by the process shown in FIG. 1, then manually verifies or modifies the network asset assignment and demographic entity resolution applied algorithmically as part of the system and method. Subsequently, the organization(s) are scored and the results delivered to the user by means of a graphical user interface, such as a web interface as viewed by a browser.

A dataset, collected by any of a number of mechanisms such as a global internet port scan performed daily over the course of several years, includes one or more historical observations of various characteristics associated with each individual address within one of the network blocks previously associated, is presented to an aggregation algorithm which calculates multiple features indicative of cybersecurity breach risk, which features are described in further detail below. A subset of these features is calculated by aggregating all records within the dataset, producing "organization features", while additional subsets are calculated by aggregating only those records within the dataset associated with a specific network, producing "network features". Such an additional subset of features is included among the broader set of features for every network comprising the organization, yielding a set of network features for each.

The multiple organization features are then used as inputs to an analytic organization model which calculates a security probability score, while the multiple sets of network features are used as inputs to a network model, by which each individual network is assigned its own security probability score. The probability score corresponding to the organization model is then combined in a predetermined manner with the set of probability scores corresponding to the network model to produce a final "Score Response" at 117 consisting both of a numeric cybersecurity breach risk score leveraging both organizational and network features and a ranked list of reason codes indicating the factors contributing to that score based on these features for use in remediation using the score.

In such embodiments, the Score Response represents the cybersecurity breach risk and contributing factors for the organization in question. In addition to reflecting information derived from the individual network scores and features—explicitly via the reason codes, and implicitly via the score itself—the Score Response may be augmented by some or all of the individual network scores or reason codes themselves. Whether and how such augmentation occurs, including the process by which the networks whose scores and reason codes are added to the Score Response are selected and the specific information relevant to these networks are determined, may vary based on the implementation in question.

In some implementations, the database in question may contain the results of daily probes indicating, for each IP address, whether or not it is configured to respond to a recursive DNS request. For example, consider a fictional organization named Acme Inc. which owns the address blocks 192.17.0.0/16 (65,536 addresses) and 206.123.112.224/27 (32 addresses). The database will be queried for all records corresponding to all addresses in these ranges. For each daily measurement, the database will contain 65,568 records. Over a hypothetical three-day window, the returned dataset in its entirety will consist of 196,704 records containing three columns: "Address", "Date", and "Responds to DNS recursive query". Those skilled in the art will recognize that several possible aggregation schemes may be implemented in order to generate feature values given such a set of input records. In one such implementation, the dataset is grouped by address, and a new Boolean value, called "Responds to DNS recursive query on any date", is calculated for each address by constructing the element-wise OR of the 3-component Boolean column "Responds to DNS recursive query". The result is a 65,568-record intermediate dataset consisting of two columns—"Address" and "Responds to DNS recursive query on any date"—which may then be converted into a meaningful risk feature by calculating the ratio of the number of records for which the Boolean column is "True" to the total number of records. Many additional risk features may be calculated in similar fashion—for example one may replace the element-wise OR operation used in constructing the final Boolean field with an element-wise AND operation, resulting in a field one might entitle "Responds to DNS recursive query on every date".

In the same implementation, several such features are generated from the complete collection of records corresponding to all addresses in blocks owned by Acme Inc. Independently, the same collection of records is partitioned according to its original network membership within the set of networks owned by the organization, resulting in one set of records for each of the networks owned by the organization. In the same example of the same implementation, this procedure will result in two distinct datasets: one for 192.17.0.0/16, consisting of 65,536 records for each daily observation, and another for 206.123.112.224/27, consisting of 32 records for each daily observation. The overall result is a set of features calculated using records corresponding to all network addresses within the organization and multiple additional sets of features, one set of features corresponding to a particular network owned by the organization, each set of which being calculated using records corresponding only to the subset of addresses within the network in question. Both the fields used in the input records, the aggregation algorithm, and the process by which the features for the organization overall are calculated may not be identical to the process by which the features for each individual network are calculated, although the processes may be chosen to be identical.

Once calculated, each of the several sets of features is used as input variables to a specified predictive model, the specific process depending in general upon whether the set of features in question correspond to all or only one of the organization's networks, and the model is used to produce a probability score reflecting the overall cybersecurity posture corresponding to the network used to calculate the features. The features calculated from each individual network separately are calibrated via empirical quantile estimation, in which the quantiles for each individual feature may be estimated in near-real time for all measurable networks corresponding to established organizations.

The algorithm used in this context applies quantile estimation, variable scaling, and scoring algorithm in analogy to Multi-Layered Self-Calibrating models. Specifically, the values of each asset variable individually are computed for all network prefixes in all organizations exceeding a certain threshold with respect to risk as measured by the overall organization score, and a pair of lower and higher quantile values $q_l$ and $q_h$ respectively, both intended to reside in the tail of the distribution, recorded for each variable. As time passes, the quantiles may be updated to reflect any changes in the underlying distribution either by a batch process as described above or by a recursive online quantile estimation algorithm.

After having established the most recent values of $q_l$ and $q_h$, the scoring process consists of two steps: First, the variables are calculated as usual based on the specific prefix or sub-asset in question, then are scaled based on their quantile values. Specifically, $$x^{(i,s)}(x^{(i)} \mid Q) = \frac{x^{(i)} - q_l^{(i)}}{q_h^{(i)} - q_l^{(i)}},$$

where $x^{(i)}$ is the raw value of the ith variable, $x^{(i,s)}$ is the scaled value of the ith variable, $q_l^{(i)}$ and $q_h^{(i)}$ are respectively the low and high quantiles of the ith variable, and Q is the vector of current high and low quantile estimates across all variables. In some implementations, the score calculation is:

$$s = \frac{1}{K} \sum_{i=1}^{K} \min(w^{(i)} x^{(i,s)}(x^{(i)} \mid Q), c),$$

where K is the total number of variables used in this embodiment of the score calculation, $w^{(i)}$ is either a manually-tuned or learned weight for the ith variable, and c is a capping constant. In various implementations, the current high and low quantiles comprising Q for the i th variable $x^{(i)}$ may be measured or estimated based on the distribution of $x^{(i)}$ either across all networks globally or individually by segmenting networks or organizations according to certain criteria. For example, the high and low quantile estimates may be measured or estimated separately for each SIC code assigned an organization, and subsequently applied in scaling only to those networks with that SIC code. Other possible criteria by which quantile estimates and scaling may be segmented in this manner are SIC group, industry classification, number of employees, annual revenue, number of physical locations, number of vendor relationships, geographical location, and many others.

The features having been calibrated to a mutually-consistent scale, the feature sets corresponding to various networks within the organization—and the scores based on the output of the analytic models corresponding to these—may be used to draw meaningful comparisons among different networks both on the basis of score and individual features. Furthermore, because the calibration applied is based on quantile estimates based either on all networks globally or by all networks within the same predefined segment(s) such as SIC group or legal status, similar comparisons may be drawn among networks both within the same organization and otherwise.

The score for each individual sub-asset within an organization is calculated as above and these scores are then combined into a single score. In some embodiments, the result of this combining process is simply the single score indicating highest risk across all sub-asset scores—in this manner the organization risk score is based strongly or entirely on the single riskiest sub-asset within the network, reflecting that sub-asset's role as the "weakest link" in the organizational security posture.

Figure 3:
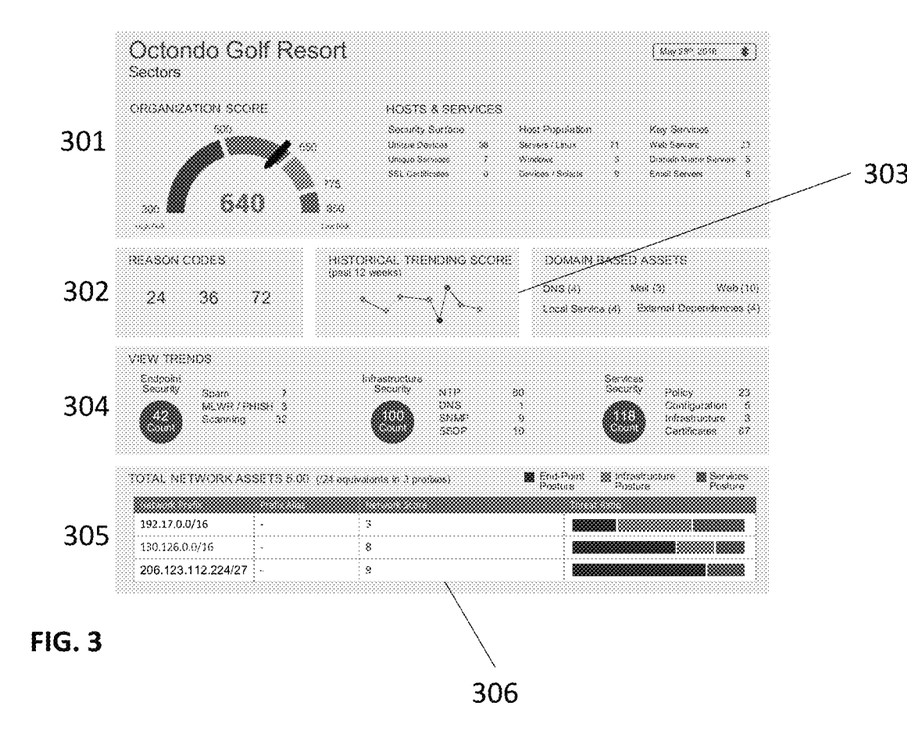
FIG. 3 illustrates a graphical user interface to provide a graphical representation of the methods described herein for providing empirical organizational cybersecurity risk assessment.

The final score, associated reason codes, a subset of the sub-asset scores themselves and associated reason codes, and select network or threat information calculated or retrieved in any aspect of the overall process are displayed to the end user as demonstrated in FIG. 3, which shows an example of the results for a single organization that can be delivered to the user by means of a graphical user interface. The results contain alphanumeric and/or graphical depictions of the organization's cyber risk score (301) and reason codes (302) associated with that score, an overview of its attack surface, the historical scores (303) for the organization in question, a summary (304) of malicious activities observed taking place on the organization's network, and a score (306) and description (305) for each individual sub-asset comprising the organization's network.

In some implementations, a computer-implemented method includes the steps of retrieving, by at least one data processor, a dataset comprising records collected via other means, indexed by IP address, whose index is within any of the network blocks associated with a specified organization via other means. The method further includes aggregating, by the at least one data processor, the same dataset corresponding to a set of network blocks associated with the organization, the aggregation being performed irrespective of the network blocks themselves except insofar as they identify the addresses to be used in the aggregation, resulting in overall aggregated data. The method can further include generating, by the at least one data processor, a set of overall organization features based on the overall aggregated data.

In some implementations, the method further includes aggregating, by the at least one data processor, the same dataset corresponding to a set of network blocks associated with the organization, the aggregation being performed for each individual network block separately, resulting in network aggregated data for each network block. The method can further include generating, by the at least one data processor, a set of network features, the processes of calculating which may or may not be identical to the same processes as for the features for each individual network block separately, based on the network aggregated data corresponding to each individual network block separately.

In some implementations, the method further includes aggregating, by the at least one data processor, demographic and firmographic data related to an organization, the aggregation generating aggregated organizational non-network data for each organization. A method can further include generating, by the at least one data processor, a set of non-network organizational features—such as SIC risk, geographical risk, network ownership data as reflected by internet governing organizations—for each organization, based on the aggregated organizational non-network data for each organization. The method can further include aggregating, by the at least one data processor, the dataset corresponding dark web intelligence data associated with organization, the aggregation being performed for both organization and each individual network block separately, resulting in network aggregated data for each network block.

In yet further implementations, a method includes generating, by the at least one data processor, a set of dark web intelligence data associated each individual network block separately and the organization, based on "dark web" intelligence data associated with organization. The term "dark web" refers to data that is hidden from normal internet queries and requiring special access methods, which are typically used to store stolen intelligence, user credentials, and valuable data such as payment card data or PII. The method can further include calculating, by the at least one data processor, an overall odds score and ranked list of overall reason codes based on the overall generated features, the odds score indicating the level of cybersecurity breach risk associated with the organization, and the ranked list of reason codes indicating the specific factors that contributed most strongly to the odds score, a set of network odds scores and ranked lists of network reason codes based on the network generated features corresponding to each individual network block separately, the network odds scores indicating the level of cybersecurity breach risk associated with the network block, and the ranked lists of network reason codes indicating the specific factors that contributed most strongly to the network odds score for the corresponding network block.

In yet other implementations, a method can include calculating, by the at least one data processor, a final odds score and ranked list of reason codes based on the overall odds score and associated overall reason codes and the set of all network odds scores and associated network reason codes, the final odds score indicating the level of cybersecurity breach risk associated with the organization. The method can further include selecting, by the at least one data processor, a subset of network scores, network reason codes, and associated metadata to be used in augmenting the information displayed along with the final cyber breach odds score, the selection being implemented by a predefined process predicated on any and all of the features, scores, reason codes, or additional characteristics. A method in accordance with some implementations can include a step of constructing, by the at least one data processor, a final Score Response consisting of the final cyber breach odds score, associated reason codes, and, optionally, fields derived from the same selected subset.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   scoring, by at least one data processor, individual network prefixes of a computer network of computer endpoints associated with an organization, the scoring being processed according to a cybersecurity breach risk scoring predictive model executed by the at least one data processor on a dataset associated with the individual network prefixes, the dataset comprising dark web intelligence data associated with the organization or the individual network prefixes, the scoring generating one or more scores representing a risk of a cybersecurity breach of one or more of the individual network prefixes, the dataset comprising an IP address mapped to the individual network prefixes and data representative of responses by the individual network prefixes to various requests at the IP address;
   aggregating, by the at least one data processor, the one or more individual network prefixes of the computer network of computer endpoints associated with the organization into an aggregated computer network dataset;
   updating, by the at least one data processor and in response to aggregating the one or more individual network prefixes, a quantile estimate at a database, the quantile estimate indicating cybersecurity breach risk for at least one network prefix of the one or more network prefixes, the quantile estimate being calibrated by comparing cybersecurity breach risks across various organizations; and
   scoring, by the at least one data processor and based on at least the updated quantile estimate, the aggregated computer network dataset, the scoring being processed according to the cybersecurity breach risk scoring predictive model executed by the at least one data processor on the aggregated computer network dataset and one or more riskiest of the individual network prefixes to generate an overall organization score, the riskiest of the individual network prefixes being determined based on a threshold score determined by the at least one data processor according to the cybersecurity breach risk scoring predictive model.

2. The method in accordance with claim 1, wherein at least one of the individual network prefixes comprises a mutually-disjoint set of IP address blocks.

3. The method in accordance with claim 2, wherein the mutually-disjoint set of IP address blocks defines an IP address space for the organization.

4. The method in accordance with claim 1, wherein the cybersecurity breach risk scoring predictive model is based on historical data related to at least one of the individual network prefixes, wherein the historical data is tagged with breach versus no-breach incidents.

5. The method in accordance with claim 1, wherein the dark web intelligence data comprises data that is hidden from normal internet queries and requires special access methods.

6. The method in accordance with claim 1, wherein the dark web intelligence data comprises stolen intelligence, user credentials, personally identifiable information, or payment card data.

7. A computer-implemented method comprising:
   calculating, by at least one data processor, one or more features indicative of a cybersecurity breach risk for a plurality of network blocks associated with an organization, the one or more of the plurality of network blocks having individual network addresses of a network associated with the organization, the calculating being based on a dataset comprising records of a plurality of historical network observations of the one or more features indicative of a cybersecurity breach risk for the plurality of network blocks, the plurality of historical network observations comprising an IP address mapped to the plurality of network blocks and data representative of responses by the plurality of network blocks to various requests at the IP address;
   aggregating, by the at least one data processor, a first set of records in the dataset, wherein the first set of records is associated with organizational features to calculate a first subset of the one or more features for the plurality of network blocks, the first set of records comprising dark web intelligence data associated with the organization or the plurality of network blocks;
   aggregating, by the at least one data processor, a second set of records in the dataset, wherein the second set of records is associated with network features of each network block of the plurality of network blocks to calculate a second subset of the one or more features indicative of a cybersecurity breach risk for the plurality of network blocks;

updating, by the at least one data processor and in response to aggregating the second set of records in the dataset, a quantile estimate at a database, the quantile estimate indicating cybersecurity breach risk for at least one feature of the one or more features of the second subset, the quantile estimate being calibrated by comparing the one feature of the one or more features of the second subset across various organizations having the one feature;

calculating, by the at least one data processor according to an analytic organization predictive model, an organizational cybersecurity breach probability score based on the first subset calculated by aggregating the records associated with the organizational features;

calculating, by the at least one data processor according to a network predictive model, a network cybersecurity breach probability score based on the updated quantile estimate and the second subset calculated by aggregating the records associated with the network features;

combining, by the at least one data processor, the organizational cybersecurity breach probability score and the network cybersecurity breach probability score to generate a score response comprising a numeric cybersecurity breach risk score that leverages both the organizational features and the network features and generating a ranked list of factors contributing to the respective organizational cybersecurity breach probability score and the network cybersecurity breach probability score; and displaying, by the at least one data processor, the score response and the ranked list of factors to a user, via a display device, for use in remediation of the numeric cybersecurity breach risk score.

8. The method in accordance with claim 7, wherein the aggregated records associated with the organizational features for calculating the organizational cybersecurity breach probability score further includes firmographic data associated with the organization.

9. The method in accordance with claim 7, wherein the aggregated records associated with the network features for calculating the network cybersecurity breach probability score further includes firmographic data associated with the organization.

10. The method in accordance with claim 7, wherein the analytic organization predictive model is based on historical data related to one or more of the plurality of network blocks, and wherein the historical data is tagged with breach versus no-breach incidents.

11. The method in accordance with claim 7, wherein the network predictive model is based on historical data related to one or more of the plurality of network blocks, and wherein the historical data is tagged with breach versus no-breach incidents.

12. A computer program product comprising a non-transitory machine-readable medium storing instructions that, when executed by at least one programmable processor, cause the at least one programmable processor to perform operations comprising:

calculating one or more features indicative of a cybersecurity breach risk for one or more of a plurality of network blocks associated with an organization, the one or more of the plurality of network blocks having individual network addresses of a network associated with the organization, the calculating being based on a dataset comprising records of a plurality of historical observations of the one or more features indicative of a cybersecurity breach for the plurality of network blocks, the dataset comprising dark web intelligence data associated with the organization or the plurality of network blocks, the plurality of historical observations comprising an IP address mapped to the plurality of network blocks and data representative of responses by the plurality of network blocks to various requests at the IP address;

aggregating a first set of records in the dataset, wherein the first set of records is associated with organizational features to calculate a first subset of the one or more features for the plurality of network blocks;

aggregating a second set of records in the dataset, wherein the second set of records is associated with network features to calculate a second subset of the one or more features indicative of a cybersecurity breach for the plurality of network blocks;

updating, in response to aggregating the second set of records in the dataset, a quantile estimate at a database, the quantile estimate indicating cybersecurity breach risk for at least one feature of the one or more features of the second subset, the quantile estimate being calibrated by comparing the one feature of the one or more features of the second subset across various organizations having the feature;

calculating, according to an organization predictive model, an organizational cybersecurity breach probability score based on the first subset calculated by aggregating the records associated with the organizational features;

calculating, according to a network predictive model, a network cybersecurity breach probability score based on the updated quantile estimate and the second subset calculated by aggregating the records associated with the network features;

combining the organizational cybersecurity breach probability score and the network cybersecurity breach probability score to generate a score response comprising a numeric cybersecurity breach risk score that leverages both the organizational features and the network features and generating a ranked list of factors contributing to the respective organizational cybersecurity breach probability score and the network cybersecurity breach probability score; and displaying the score response and the ranked list of factors to a user, via a display device, for use in remediation of the numeric cybersecurity breach risk score.

13. The computer program product in accordance with claim 12, wherein the aggregated records associated with the organizational features for calculating the organizational cybersecurity breach probability score further includes firmographic data associated with the organization.

14. The computer program product in accordance with claim 12, wherein the aggregated records associated with the network features for calculating the network cybersecurity breach probability score further includes firmographic data associated with the organization.

15. The computer program product in accordance with claim 12, wherein the organization predictive model is based on historical data related to one or more of the plurality of network blocks, and wherein the historical data is tagged with breach versus no-breach incidents.

16. The computer program product in accordance with claim 12, wherein the network predictive model is based on historical data related to one or more of the plurality of network blocks, and wherein the historical data is tagged with breach versus no-breach incidents.

17. A system comprising:
at least one programmable hardware processor; and
a machine-readable medium storing instructions that, when executed by the at least one programmable hardware processor, cause the at least one programmable hardware processor to perform operations comprising:
- calculate one or more features indicative of a cybersecurity breach risk for one or more of a plurality of network blocks associated with an organization, the one or more of the plurality of network blocks having individual network addresses of a network associated with the organization, the calculating being based on a dataset comprising records of a plurality of historical observations of the one or more features indicative of a cybersecurity risk for the plurality of network blocks, the dataset comprising dark web intelligence data associated with the organization or the plurality of network blocks, the plurality of historical observations comprising an IP address mapped to the plurality of network blocks and data representative of responses by the plurality of network blocks to various requests at the IP address;
- aggregate a first set of records in the dataset, wherein the first set of records is associated with organizational features to calculate a first subset of the one or more features indicative of a cybersecurity risk for the plurality of network blocks;
- aggregate a second set of records in the dataset, wherein the second set of records is associated with network features to calculate a second subset of the one or more features for the plurality of network blocks;
- update, in response to aggregating the second set of records in the dataset, a quantile estimate at a database, the quantile estimate indicating cybersecurity breach risk for one feature of the one or more features of the second subset, the quantile estimate being calibrated by comparing the one feature of the one or more features of the second subset across various organizations having the one feature;
- calculate, according to an organization predictive model, an organizational cybersecurity breach probability score based on the first subset calculated by aggregating the records associated with the organizational features;
- calculate, according to a network predictive model, a network cybersecurity breach probability score based on the updated quantile estimate and the second subset calculated by aggregating the records associated with the network features;
- combine the organizational cybersecurity breach probability score and the network cybersecurity breach probability score to generate a score response comprising a numeric cybersecurity breach risk score that leverages both the organizational features and the network features and generating a ranked list of factors contributing to the respective organizational cybersecurity breach probability score and the network cybersecurity breach probability score; and
- display the score response and the ranked list of factors to a user, via a display device, for use in remediation of the numeric cybersecurity breach risk score.

18. The system in accordance with claim 17, wherein the aggregated records associated with the organizational features for calculating the organizational cybersecurity breach probability score further includes firmographic data associated with the organization.

19. The system in accordance with claim 17, wherein the aggregated records associated with the network features for calculating the network cybersecurity breach probability score further includes firmographic data associated with the organization.

20. The system in accordance with claim 17, wherein the organization predictive model is based on historical data related to one or more of the plurality of network blocks, and wherein the historical data is tagged with breach versus no-breach incidents.

21. The system in accordance with claim 17, wherein the network predictive model is based on historical data related to one or more of the plurality of network blocks, and wherein the historical data is tagged with breach versus no-breach incidents.

* * * * *